United States Patent [19]

Tuinstra et al.

[11] Patent Number: 5,276,134
[45] Date of Patent: Jan. 4, 1994

[54] PROCESS FOR THE PREPARATION OF PHENYL CARBONATES OR POLYCARBONATES

[75] Inventors: Hendrik E. Tuinstra, Midland; Cynthia L. Rand, Sanford, both of Mich.

[73] Assignee: The Dow Chemical Company, Midland, Mich.

[21] Appl. No.: 577,423

[22] Filed: Sep. 4, 1990

Related U.S. Application Data

[63] Continuation-in-part of Ser. No. 27,585, Mar. 18, 1987, abandoned, which is a continuation-in-part of Ser. No. 27,470, Mar. 18, 1987, abandoned.

[51] Int. Cl.$^5$ .............................. C08G 64/38
[52] U.S. Cl. .................... 528/371; 526/67; 526/68; 528/196; 528/271; 528/370
[58] Field of Search .............. 528/371, 196, 271, 370; 526/67, 68

[56] References Cited

U.S. PATENT DOCUMENTS 4,333,885  6/1982  Feitler .
4,954,613  9/1990  Hudson .............................. 528/371

Primary Examiner—Harold D. Anderson

[57] ABSTRACT

A process for the preparation of an aromatic carbonate or polycarbonate from a phenol or bisphenol, methanol, carbon monoxide and oxygen comprising the steps of 1) reacting phenol or bisphenol with acetic anhydride to form (bis)phenyl acetate; 2) reacting dimethyl carbonate with (bis)phenyl acetate from step 1 to produce a phenyl carbonate or polycarbonate and methyl acetate; and 3) reacting the methyl acetate with carbon monoxide to produce acetic anhydride for use in step 1. In a desirable embodiment the dimethyl carbonate may also be prepared by reaction of methanol, carbon monoxide and oxygen.

6 Claims, No Drawings

PROCESS FOR THE PREPARATION OF PHENYL CARBONATES OR POLYCARBONATES

CROSS REFERENCE TO RELATED APPLICATION

This application is a continuation-in-part of copending application Ser. No. 027,585 filed on Mar. 18, 1987 now abandoned and copending application Ser. No. 027,470 also filed on Mar. 18, 1987 now abandoned.

BACKGROUND OF THE INVENTION

The present invention relates to a process for the preparation of phenyl carbonates or polycarbonates. More particularly, the present invention allows for the preparation of phenyl carbonates or polycarbonates utilizing as reactants a corresponding phenol or bisphenol; methanol; carbon monoxide; and oxygen.

In U.S. Pat. No. 4,182,726 a process for preparing aromatic carbonates utilizing Lewis acids to catalyze the transesterification of phenols or acyl esters thereof with an alkyl carbonate or an aryl alkyl carbonate was disclosed.

In U.S. Pat. No. 4,533,504 an integrated process for the preparation of aromatic carbonates was disclosed wherein the methyl acetate by-product formed in the transesterification of a phenyl ester with a dialkyl carbonate was recycled by heating the alkyl ester to form a ketene and subsequently such ketene was reconverted by reaction with a phenol to form additional quantities of the phenyl ester.

Preparation of a ketene intermediate has proven costly and inefficient due to the high temperatures involved. Recoveries on the order of only about 80% of theoretical or less are typical leading to the need to develop a more efficient means of generating phenyl carbonate precursors and disposing of alkyl ester by-products.

In U.S. Pat. No. 4,452,968 an integrated process for the preparation of aromatic polycarbonates was disclosed wherein the methyl acetate by-product formed in the transesterification of a bisphenol diacetate with a dialkyl carbonate was recycled by heating the alkyl ester to form a ketene and subsequently such ketene was reconverted by reaction with a bisphenol to form additional quantities of the bisphenol diacetate. For the teachings contained therein the above identified patent is incorporated herein by reference thereto. As mentioned above, preparation of a ketene intermediate has proven costly and inefficient due to the high temperatures involved, leading to the need to develop a more efficient means of generating polycarbonate resins and recycling of alkyl ester by-products.

SUMMARY OF THE INVENTION

According to the present invention, there is now provided a process for producing an aromatic carbonate or polycarbonate comprising the steps of:

I. reacting acetic anhydride with a reactant selected from a phenol or a bisphenol to produce a (bis)phenyl acetate and acetic acid;

II. reacting dimethyl carbonate with at least a portion of the (bis)phenyl acetate from step I to produce a (bis)phenyl carbonate and methyl acetate;

III. separating the (bis)phenyl carbonate and methyl acetate;

IV. reacting the methyl acetate with carbon monoxide in the presence of a catalyst to prepare acetic anhydride; and V. employing the acetic anhydride from step IV as at least a portion of the acetic anhydride reactant of step I.

According to another embodiment of the present invention, there is now provided a process for producing an aromatic carbonate comprising the steps of:

A. reacting acetic anhydride with a phenol to produce a phenyl acetate and acetic acid;

B. reacting dimethyl carbonate with at least a portion of the phenyl acetate from step A to produce a phenyl carbonate and methyl acetate;

C. separating the phenyl carbonate and methyl acetate;

D. reacting the methyl acetate with carbon monoxide in the presence of a catalyst to prepare acetic anhydride; and E. employing the acetic anhydride from step D as at least a portion of the acetic anhydride reactant of step A.

According to another embodiment of the present invention, there is now provided a process for producing an aromatic carbonate comprising the steps of:

i. reacting acetic anhydride with a bisphenol to produce a bisphenyl diacetate and acetic acid;

ii. reacting dimethyl carbonate with at least a portion of the bisphenyl diacetate from step i to produce a polycarbonate and methyl acetate;

iii. separating the polycarbonate and methyl acetate;

iv. reacting the methyl acetate with carbon monoxide in the presence of a catalyst to prepare acetic anhydride; and v. employing the acetic anhydride from step iv as at least a portion of the acetic anhydride reactant of step i.

DETAILED DESCRIPTION OF THE INVENTION

The reaction of phenols or bisphenols with acetic anhydride to form a phenyl or bisphenyl acetate and acetic acid, is a well known acetylation reaction. Suitable process conditions are disclosed for example in USP 4,374,263, the teachings of which are incorporated herein by reference thereto. By the term phenol is also included inertly substituted phenols, however, the preferred reactant is phenol, i.e., hydroxybenzene. In schematic form, the reaction of a phenol and acetic anhydride may be depicted by the following illustration.

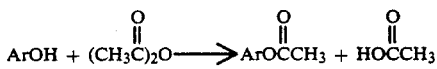

wherein Ar represents a $C_{6-20}$ aryl group or substituted aryl group particularly phenyl.

By the term bisphenol is also included inertly substituted bisphenols. Examples of suitable bisphenol reactants include bisphenol-A, bisphenol-F, bisphenol-K, dihydroxy biphenyl, and halo, or $C_{1-6}$ alkyl substituted derivatives of the foregoing. In schematic form, the reaction of a bisphenol and acetic anhydride may be depicted by the following illustration.

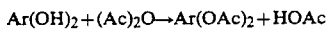

wherein Ar represents a bisphenol remnant formed by removal of two hydroxyl groups therefrom, and Ac represents an acetyl radical.

By the term (bis)phenyl it is meant the phenyl or bisphenyl substituents.

The reaction with acetic anhydride is conducted at moderate temperatures on the order from about 25° C. to 100° C. The products are easily separated by fractional distillation or other suitable technique. While numerous catalysts are known for the transesterification process, preferred catalysts are acids, especially heterogeneous macroporous ion exchange resins in the acid form.

The dimethyl carbonate, one reactant used in the process of the present invention, may be prepared by the reaction between methanol, carbon monoxide and oxygen, according to any suitable procedure. Suitable are those processes disclosed in U.S. Pat. Nos. 3,846,468, 3,980,690, 4,452,968, 4,533,504, and 4,360,477, the teachings of which are incorporated herein by reference thereto. The reaction is generally expedited by the use of a catalyst, particularly a copper complex and the use of elevated temperatures and pressures.

Reaction of dimethyl carbonate and a phenyl or bisphenyl acetate to give the desired phenyl carbonate or polycarbonate and by-product alkyl acetate is a known chemical transformation. This step of the process may be illustrated schematically for phenyl acetate by the following diagram.

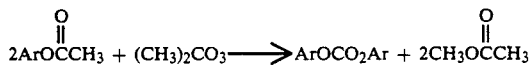

wherein Ar is as previously defined.

The above reaction for phenyl acetate has been previously disclosed, for example, in U.S. Pat. No. 4,182,726, and U.S. Pat. No. 4,533,504. The teachings of these U.S. Patents are hereby incorporated in their entirety by reference thereto. In a highly desirable embodiment of the present invention, this reaction is conducted in the presence of a catalyst particularly a Lewis acid.

The phenyl carbonate product is a highly desired article of commerce for conversion into polycarbonate resins. Processes for such conversion are also well known having been disclosed in U.S. Pat. Nos. 3,625,920, 3,888,826, 4,330,664 and elsewhere. Included in the synthesized product may be a mixture of both the mono- and ditransesterified products, that is both the diphenyl carbonate and phenyl methyl carbonate products are formed.

For the corresponding bisphenyl acetate reaction to produce polycarbonate, this step of the process may be illustrated schematically by the following diagram.

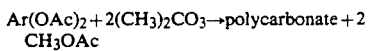

wherein Ar and Ac are as previously defined.

The above reaction preparing polycarbonate has been disclosed, for example, in the previously discussed U.S. Pat. No. 4,452,968. In a highly desirable embodiment of the present invention, this reaction is conducted in the presence of a catalyst particularly a Lewis acid. The initial polycarbonate produced in this step is generally a relatively low molecular weight oligomer having from 1 to 4 repeating units. Higher molecular weight polymers are produced by heating this oligomer in the presence of a catalyst.

The methyl acetate is readily separated from the phenyl carbonate or polycarbonate products by use of standard distillation techniques and the by-product, methyl acetate, is recycled by means of a reaction with carbon monoxide to produce acetic anhydride that is used in the initial process step. Suitable processes for such reaction between methyl acetate and carbon monoxide are known and previously disclosed in the art, for example, in U.S. Pat. Nos. 4,374,070, 4,559,183, and 4,046,807, the teachings of which are incorporated herein by reference and in S. W. Polichnowski, J. CHEM. ED., 63, 206 (1986). A preferred process utilizes a noble metal catalyst and temperatures on the order of from about 160° to about 220° C.

It may be readily observed that the present process scheme allows for the overall conversion of a phenol or bisphenol to the corresponding phenyl carbonate or polycarbonate utilizing as reactants methanol, carbon monoxide and oxygen. The recycle of methyl acetate intermediate allows for great economy and simplicity in the resulting process compared to the generation of a ketene intermediate. The present process utilizes much lower reaction temperatures and results in greatly improved efficiency of operation. Moreover, intermediate by-product acetic acid may also be recycled if desired by reaction with additional methanol to form methyl acetate and then carbonylated as above explained to form acetic anhydride. Alternatively, the acetic acid, which represents a significant increase in value over the starting material, methanol, may be sold.

Where the operator desires to prepare dimethyl carbonate as part of the total synthesis, the present invention allows for a simplified and highly efficient route to the preparation of phenyl carbonates or polycarbonates from phenols or bisphenols, methanol, carbon monoxide and oxygen.

What is claimed is:

1. An integrated process for producing a polycarbonate comprising the steps of:
   i. reacting acetic anhydride with a bisphenol to produce a bisphenyl diacetate and acetic acid;
   ii. reacting dimethyl carbonate with at least a portion of the bisphenyl diacetate from step i to produce a polycarbonate and methyl acetate;
   iii. separating the polycarbonate and methyl acetate;
   iv. reacting the methyl acetate with carbon monoxide in the presence of a catalyst to prepare acetic anhydride; and
   v. recycling the acetic anhydride from step iv as a least a portion of the acetic anhydride reactant of step i.

2. A process according to claim 1 wherein the dimethyl carbonate and bisphenyl diacetate are reacted in step ii by contacting in the presence of a titanate or stanate catalyst.

3. A process according to claim 1, wherein the methyl acetate and carbon monoxide are reacted in step iv by contacting at a temperature of from about 160° to about 220° C. in the presence of a noble metal catalyst.

4. A process according to claim 1, wherein the bisphenol is bisphenol A.

5. A process according to claim 1 wherein acetic acid is recovered.

6. An integrated process for producing a polycarbonate comprising the steps of:

i. reacting acetic anhydride with a bisphenol to produce a bisphenyl diacetate and acetic acid;
ii. reacting dimethyl carbonate with at least a portion of the bisphenyl diacetate from step i in the presence of a catalyst to produce a low molecular weight polycarbonate oligomer and methyl acetate;
iii. separating the polycarbonate oligomer and methyl acetate;
iv. reacting the methyl acetate with carbon monoxide in the presence of a catalyst to prepare acetic anhydride;
v. recycling the acetic anhydride from step iv as a least a portion of the acetic anhydride reactant of step i; and
vi. heating the polycarbonate oligomer in the presence of a catalyst to produce a higher molecular weight polymer.

* * * * *